Nov. 30, 1943.  A. MOUNT  2,335,601

WORK INDEXING APPARATUS FOR WALKING BEAM FURNACES

Filed Jan. 25, 1943

Inventor
Alfred Mount

By
Charles A. Lind
Attorney

Patented Nov. 30, 1943

2,335,601

UNITED STATES PATENT OFFICE 2,335,601

WORK INDEXING APPARATUS FOR WALKING BEAM FURNACES

Alfred Mount, Gadsden, Ala., assignor to General Properties Company, Inc., Toledo, Ohio, a corporation of Delaware Application January 25, 1943, Serial No. 473,569

3 Claims. (Cl. 214—18)

In heat treating furnaces embodying a walking beam conveyer for advancing work pieces to and into the furnace chamber it is frequently necessary or desirable particularly in cases where the conveyer is adapted for simultaneously advancing a plurality of laterally spaced rows of said work pieces to so arrange the work pieces on the conveyer that the work pieces in the various longitudinal rows are in alinement crosswise of the conveyer; and it is the object of the present invention to provide a relatively simple and practical apparatus which shall make it a simple matter to initially arrange the work pieces on the conveyer in that manner.

In the accompanying drawing forming part of this specification—

Figure 1:
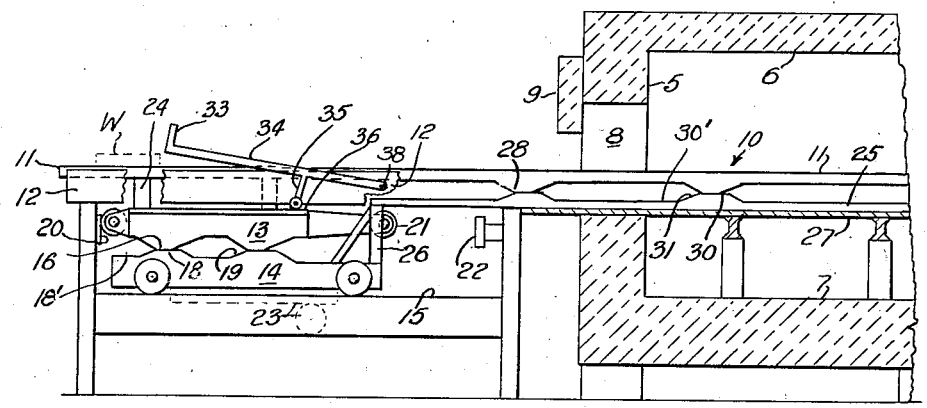
Fig. 1 is a view partly in side elevation and partly in vertical section of a sufficient portion of a heat treating furnace embodying a walking beam conveyer to illustrate the application of the present invention thereto.
Figure 2:
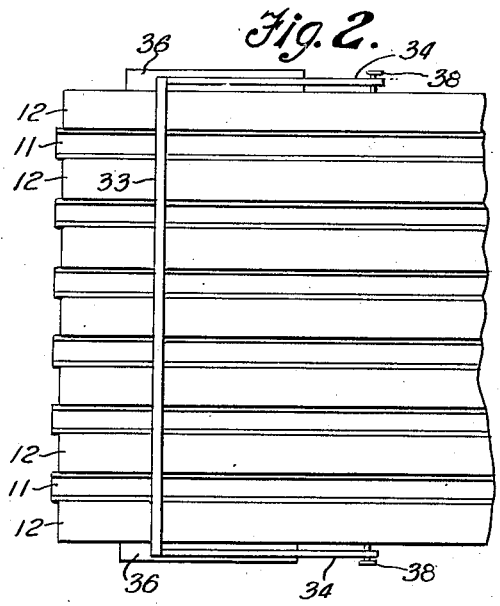
Fig. 2 is a fragmentary plan view of a portion of Fig. 1 except that the work lifting rails are shown in lowered position instead of in raised position as in Fig. 1.
Figure 3:
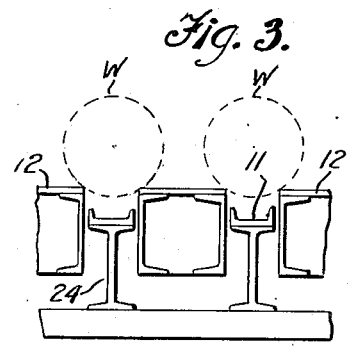
Fig. 3 is a fragmentary end elevation on an enlarged scale of parts shown in Fig. 2.

In the drawing 5 indicates the front wall of a relatively wide furnace chamber whose top and bottom walls are indicated at 6 and 7. The front wall has a door opening 8 whose effective height is controlled by a vertically movable door 9. A walking beam conveyer is generally indicated at 10, the loading station of the same being outside of said chamber.

The conveyer comprises a plurality of laterally-spaced vertically and horizontally movable rails 11 for first lifting a plurality of longitudinally extending rows of work pieces W from a plurality of longitudinally extending work-supporting guideways formed by longitudinally extending laterally spaced beams 12 and then advancing the work pieces a predetermined distance along said guideways before redepositing the work pieces on their respective guideways—the complete cycle of movement of said rails being up, forward, down and back. The work pieces are shown as cylindrical objects adapted to span the space between the adjacent beams 12 and the work-engaging side of the rails 11 are channeled to prevent said objects from rolling off said rails when supported thereby.

The means for moving the rails 11 comprises an upper carriage 13 which is frictionally supported on a lower carriage 14 supported on a trackway 15. The lower carriage is adapted to be moved back and forth on the trackway by any preferred means shown in outline as comprising a rack and pinion 23. The underside of the upper carriage is provided with heels 16 and the top side of the lower carriage is provided with upper and lower seats 18 and 18', said seats being connected by inclined planes 19 up and down which said heels are adapted to ride at certain times during the movement of the lower carriage on its trackway 15.

The limit of movement of the two carriages 13 and 14 towards the left is shown in Fig. 1. When the lower carriage moves towards the right the upper carriage moves along with it as a unit until a projecting end 21 of the upper carriage meets an abutment 22. As the lower carriage moves on to the end of its stroke the relative movement between the carriages causes the heels 16 of the upper carriage to move down the inclines 19 in the upper carriage until the heels 16 reach the lower seat 18'. The lower carriage then moves back towards the left and the upper carriage moves with it as a unit until the leading end of the upper carriage meets an abutment 20. As the lower carriage moves on to the end of its stroke the relative movement between the carriages causes the heels 16 of the upper carriage to ride up the inclines 19 on the lower carriage until the said heels are fully seated on the upper seats 18 of the lower carriage as shown in Fig. 1.

Where the rails 11 overlie the upper carriage 13 they are fixedly secured thereto by means shown as comprising upstanding members 24 and it will, therefore, be understood that said rails are movable as a unit with the upper carriage. In the furnace chamber each rail 11 is supported on underlying rail 25 which extends into said chamber from an anchorage 26 on the lower carriage 14 and which is slidably supported in the chamber on a wear plate 27. The underside of the upper rail has a series of heels 28 and the top side of the lower rail has a series of upper and lower seats 30 and 30' connected by an inclined plane 31 up and down which the heels 28 are adapted to ride at the same time that the heels 16 on the upper carriage 13 ride up and down the inclines 19 on the lower carriage 14.

In its essential features the walking beam conveyer above described is substantially the same as that disclosed in United States Patent No. 2,057,367.

In accordance with the present invention there is disposed across the loading station of the conveyer a cross bar 33 supported for up and down movement by a pair of arms 34 turnably mounted on pins 38 carried by stationary supports which for illustrative purposes have been shown as the two outer beams 12. When the bar 33 is down it serves as a stop against which the work pieces W may be placed in being placed on their supporting guideways between the beams 12 thereby insuring that the work pieces are in alinement crosswise of the conveyer. In order for the work pieces to be moved along their respective guideways by the rails 11 the bar 33 must, of course, be moved upwardly so that the work pieces may pass thereunder.

In accordance with the present invention the bar 33 is moved upwardly and downwardly by means comprising an upright vertically-movable follower 35 whose lower end rides on a shelf 36 carried by the upper carriage 13 and whose upper end engages with the bar supporting side arm 34 of the bar, the arrangement being such that when the carriage moves upwardly the follower is moved upwardly to turn the bar-supporting arms 34 on the supporting pins 38 in a clockwise direction as viewed in Fig. 1 to thereby raise the bar 33, it being understood that the bar will be held in its uppermost position during the entire time that the upper carriage remains in its uppermost position and that the bar will be lowered when said carriage is lowered. As shown in Fig. 1 the upper end of the follower 35 is preferably fixedly secured to the side arm 34.

What I claim is:

1. In combination, a furnace chamber, a work-supporting guideway leading to said chamber, a vertically movable cross bar disposed across the guideway and adapted when in down position to serve as a stop against which the work may be placed in initially placing the same on the guideway, means comprising a vertically and horizontally movable member for moving the work along said guideway, and means comprising a vertically movable follower which rides on said member for moving said bar upwardly and downwardly as said member moves upwardly and downwardly.

2. In combination, a furnace chamber, a work-supporting guideway leading to said chamber, a vertically movable cross bar disposed across said guideway and adapted when in down position to serve as a stop against which the work may be placed in initially placing the same on the guideway, means comprising a vertically and horizontally movable member for moving the work along said guideway, means comprising a pivotally supported arm for supporting said stop, and means comprising a vertically movable follower which rides on said member for actuating said arm as said member moves up and down whereby to raise said bar when said member moves upwardly and to lower the bar when said member moves downwardly.

3. In combination, a furnace chamber, a plurality of laterally spaced work-supporting guideways leading to said chamber, a vertically movable cross bar disposed across said guideways and adapted when in down position to serve as a stop against which the work may be placed in being placed on the guideways, means for simultaneously lifting all of the work from said guideways and then moving the same along the guideways a predetermined distance, and means operable at the same time the work is lifted from said guideways for moving said cross bar upwardly out of the way of the path of movement of said work.

ALFRED MOUNT.